April 27, 1948.  J. L. WESTMORELAND  2,440,422
TRACTOR MOUNTED BUZZ SAW RIGGING
Filed June 27, 1944  2 Sheets-Sheet 1
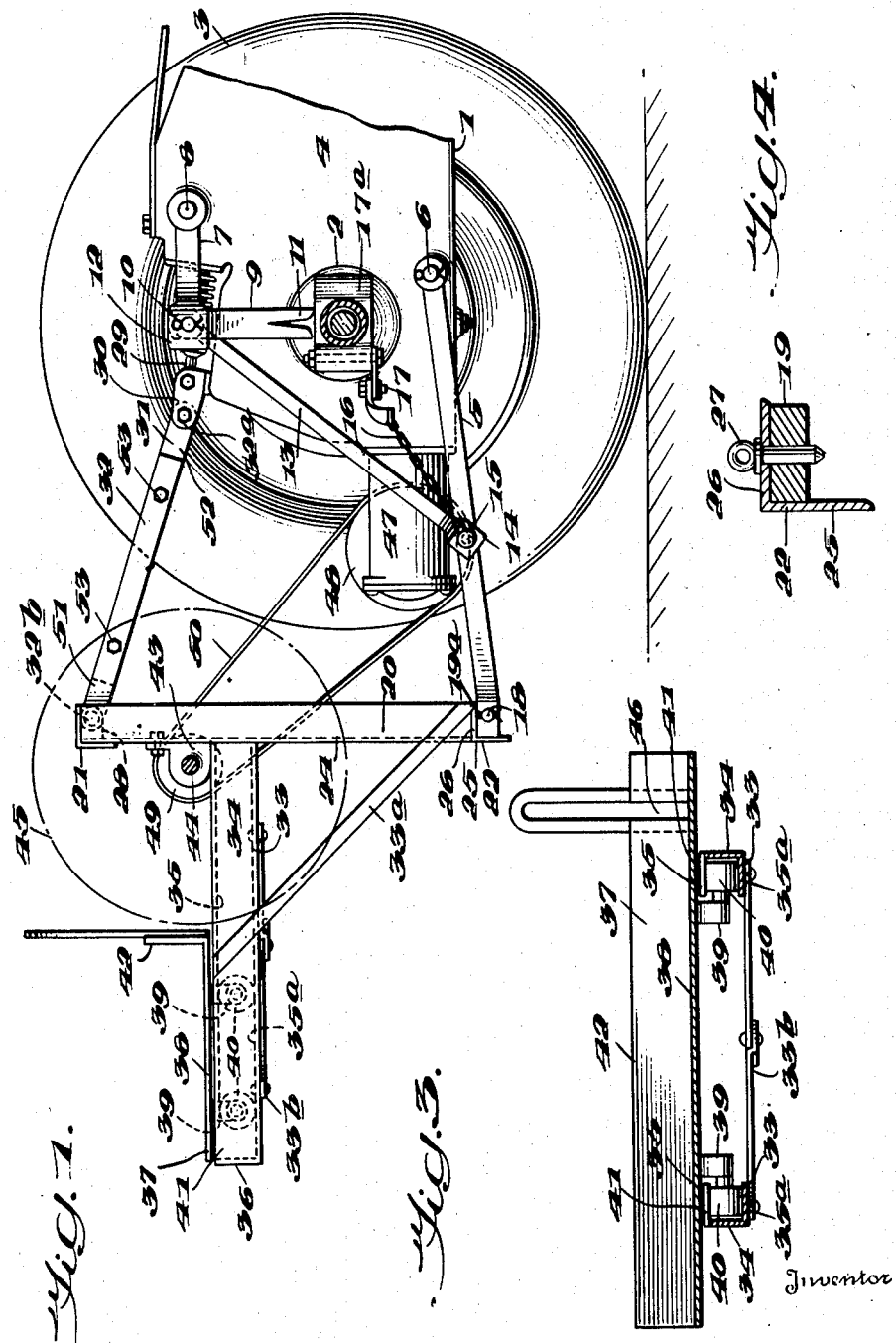
Inventor
JOHN LEONARD WESTMORELAND,
By George F. Vaia.
his Attorney

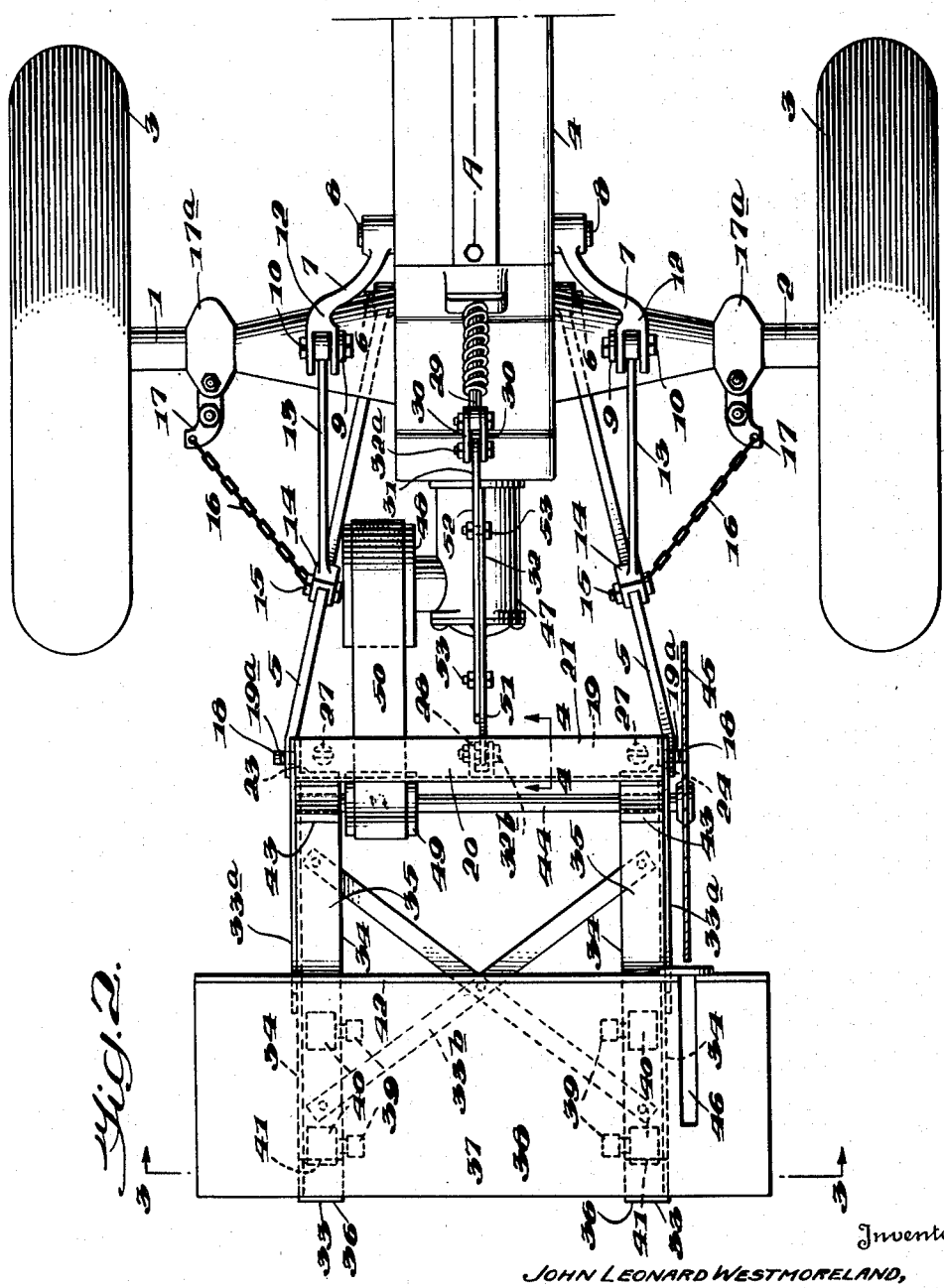

Patented Apr. 27, 1948

2,440,422

UNITED STATES PATENT OFFICE 2,440,422

TRACTOR-MOUNTED BUZZ-SAW RIGGING

John Leonard Westmoreland, Canton, N. C.

Application June 27, 1944, Serial No. 542,331

2 Claims. (Cl. 143—43)

The invention pertains to an improvement in a saw rigging suitable for attachment to a power tractor.

An object of the invention is the provision of a saw rigging of skeletonized form which is supported solely by a power tractor and, therefore, may be readily transported from one location to another without adjustment or without disconnecting it from the tractor.

A further object of the invention is the provision of a saw rigging for attachment to a power tractor with the saw rigging so arranged and constructed that it may be operated without regard to the disposition of the tractor, that is to say, the tractor may be on extremely uneven ground and the saw rigging will still be operable.

Another object of the invention is to provide a saw rigging of skeletonized form so that it may be readily and easily assembled with or disassembled from a power tractor by a single person.

An added object of the invention is the provision of a saw rigging of simple design, durable and rugged construction, relatively few parts, light sturdy components and inexpensive in manufacture.

These and other objects will become apparent from the succeeding description considered together with the accompanying drawings which disclose an exemplified form of the invention and wherein:

Figure 1 is a side elevational view of a saw rigging embodying the present invention.

Figure 2 is a plan view of the saw rigging illustrated in Figure 1.

Figure 3 is a cross sectional view taken along the lines 3—3 of Figure 2, looking in the direction of the arrows.

Figure 4 is a sectional view taken along the lines 4—4 of Figure 2, looking in the direction of the arrows.

Referring now in detail to the drawings, wherein throughout the several views like reference characters indicate like parts, the numeral 1 is employed to designate a power tractor of the usual or commercial design and only a rear or pertinent portion of which is illustrated. It is deemed unnecessary to illustrate the remaining or undisclosed portion of the power tractor for it forms no part of the present invention.

The power tractor comprises a rear housing 2 having rotatably associated with the transverse limits thereof the usual demountable wheels 3 which support a rear extremity of the tractor and through the medium of which the tractor is moved from one location to another. Also as is customary, the rear housing encases an axle or axles and train of gears or differential (neither of which are shown) through which rotative power is transmitted to the wheels. The intermediate portion of the rear housing is enlarged to form a casing 4 of sufficient proportions to accommodate the proposed components (not shown) which, among other details, include the differential or train or gears hereinbefore mentioned.

Disposed substantially horizontal is a pair of links or bottom supports 5 each of which is positioned on one side of the longitudinal center line of the power tractor indicated by the diagrammatic line A. Each link or bottom support has one or an inner extremity thereof pivotally connected or secured to a side of the casing adjacent the lower extremity thereof and through the medium of any suitable means such as the pin 6. Associated with the upper area of the casing on each side of the center line A of the tractor is a normally horizontal rearwardly extending bracket 7 of a hydraulic mechanism pivotal with and about the axis of the shaft 8. The hydraulic mechanism (not shown), which is located within the casing, is a part of the power tractor proper. However, it is not deemed necessary to illustrate and describe the mechanism except to say that it controls the action of the arms or brackets to ordinarily control the working depth or action of many other implements or components which may be associated therewith incident to the use of the tractor. Ordinarily the arms or brackets, of sinuous or reversed curve formation, are rotatable within certain degrees about the shaft 8 but, because of the desirability of maintaining the arms in a fixed predetermined position when the structure of the invention is associated with the power tractor, there is pivotally associated with the free or rear extremity of each arm a stanchion, standard or post 9. Each stanchion or post extending vertically normally is disposed inwardly of the tractor and of a related arm and has its upper end connected to the arm through the medium of a pin 10. The lower extremity of each stanchion is bifurcated as at 11 so as to straddle the subjacent portion of the rear housing and because of this relationship the arms 10 are prevented pivoting about the shaft 8. When it is desired, in connection with other implements, to employ the hydraulic operating feature of the arms they are rotated slightly in a clockwise direction until the standard may pivot free from the lower supporting rear housing at which time the stanchions are rotated in a clockwise direction through an arc of substantially 270 degrees where, by reason of the particular configuration of the arms, the standards will rest upon the arms to be disposed in inoperative position and thus not interfere with the successful operation of the hydraulic operating mechanism. However, for the accommodation of hereinafter described components, it is desirable to hold the arms against pivotal movement and thus the standards are arranged vertically to function as a rigid connection between the free extremities of the arms and the rear housing.

Each arm has its free extremity formed as a jaw 12 and disposed therein is one end of a hanger, tie means or suspension brace 13 secured to the arm jaw through the medium of the pin 10. The suspension brace extends from the arm jaw downwardly and rearwardly to terminate in a jaw 14 which is connected to a related subjacent link 5 intermediate the ends thereof. A bolt 15 or any other desired means is employed to connect each hanger jaw and link. By reason, therefore, of the triangularly spaced and arranged connections, the tie means are capable of maintaining the links in a fixed, predetermined, supported and extended position. So as to overcome any lateral thrusts to which the saw rigging may be subjected in service, guy means or stabilizing means is incorporated in the structure and, as exemplary of such a means, there is provided a chain 16 or any other desired means having one or an outer end removably secured preferably to a bolt 15 while the other or inner end is connected through a clip and bolt 17 to a pad 17a on the rear housing at a position adjacent a related wheel. The stabilizing means diverges forwardly from the link-hanger connection to transversely spaced locations on the rear housing and, accordingly, the saw rigging is reinforced against lateral thrusts.

As previously indicated, the links diverge rearwardly of the power tractor from the rear axle and their outermost extremities are apertured for the accommodation of hubs 18 outstanding from and forming a part of a horizontally disposed, transverse directed draw bar or drag bar 19. Bisecting each hub outwardly from a related extremity is a cotter pin or key 19a which removably locks the link to the draw bar. The draw bar, forming a connecting sill tying the free ends of the links together, is preferably rectangular in cross section as clearly illustrated in Figure 4 so as to present a strong, sturdy or rigid member.

Mounted upon the bar is a vertical, transversely disposed frame or framework 20 comprising an upper or horizontal rail 21 spaced above a lower horizontal rail 22 which have their related ends joined or united integrally by vertical, laterally spaced side rails 23 and 24. Each rail is desirably formed of an angle of commercial design to present a light sturdy frame with the lower rail having a depending leg 25 extending downwardly in abutting relation with the draw bar and a horizontal leg 26 bearing upon or supported by the draw bar.

Removably securing the frame to the draw bar is a plurality of dowels or bolts 27 which extend through aligned apertures in the horizontal leg 26 and the draw bar. The upper rail has, adjacent its center, a forwardly opening clip or U-shaped jaw 28 secured to the top rail by any desired means, none of which are shown.

Outstanding or directed rearwardly from the casing intermediate the limits of the arms is a shaft 29 which normally forms a component of the hydraulic mechanism hereinbefore described and aside from its relation with the saw rigging forms no other part of the present invention so that it is not believed necessary to state herein other than the shaft 29 is positioned above the axle proper and is located on the longitudinal center line of the power tractor.

Pivotally connected to the shaft 29 is a pair of rearwardly directed, connecting bands forming a clevis 30 which have their free extremities overlying an inner extremity 31 of an adjustable means, compound lever or strap 32. A bolt or pin 32a is employed to pivotally secure the inner extremity of the strap to the clevis. The outer extremity of the adjustable strap extends within the jaw 28 at the center of the top rail to which it is removably secured through the medium of a tie means or pin 32b and thus the strap forms a stiff, light member to maintain the frame in an upright or predetermined position as illustrated.

Heretofore saw riggings have been cumbersome, heavy structures requiring or consuming considerable time in being assembled with a power tractor. Also in the majority of instances a saw rigging is of such design and construction that it is necessary to remove the saw rigging entirely from the power tractor when the latter is to be used in connection with other duties. The above most usually also necessitates the services of a plurality of operators or mechanics to assemble or disassemble the saw rigging with or from a power tractor. As will be noted, the present construction is of such light and simple design and construction that it requires a relatively short time of one person unskilled to mount the saw rigging on a tractor. Once the strap, links, hangers, draw bar and standards have been assembled with the power tractor they may, for all purposes and intent, form a permanent part or components thereof since they may be employed as attachments for various other implements such as a plow, wagon, harrow, etc. That is to say, all of these implements may be attached to the draw bar while the saw rigging is also associated with the power tractor so as to be towed along behind the power tractor. Accordingly, when it is desired to saw wood and considering the illustrated construction with the frame and its immediate components hereinafter described removed from the remainder of the rigging the services of a single person only need be employed to raise the frame so as to be supported by the draw bar. At this time the dowels 27 are inserted at the aligned accommodating openings, the strap is connected to the top rail jaw and the mechanism is completely assembled to proceed with the process of sawing wood.

Secured to each frame side rail intermediate the height thereof is a horizontally and rearwardly directed guide or track 33 of channel formation in vertical section to present a vertical web 34 and upper and lower legs 35 and 35a respectively. Struts 33a extend between the guide webs and side rails to support or reinforce the guides. An X or cross frame 33b joins the guide lower legs to prevent a spreading or approach action of the guides. Arranged to move horizontally above the guides or tracks is a transfer table or carriage 37 having a base or top 38 overlying the tracks and forming a support for a section of lumber or log. Brackets or bearings 39 depend from beneath the carriage base to have outstanding therefrom rotatable means, rollers or wheels 40 housed within the guides to be supported thereby. Accordingly the carriage is arranged to be moved along a predetermined, fixed path toward and away from the frame and is prevented from shifting transversely or tilting relative to the tracks when subjected to service forces. The reentrant flanges 36 are provided to prevent an accidental displacement of the carriage and guides and in order to assemble the transfer table or carriage with the tracks the upper legs of the latter have, in the proximity of the reentrant flanges, apertures 41 opening into the channeled guides. Accordingly, in assembling the transfer table with the guides, the lead wheels or rollers of the table are first threaded through the apertures 41 and the table is thus moved forwardly until the trailing wheels or rollers overlie the apertures at which time they too are threaded through the apertures to be disposed within the confines of the guides. A vertical and transverse dash board 42 is provided on the transfer table to present a barrier or bulkhead against which the lumber or logs may bear during a sawing operation to assist the operator in maintaining the worked piece in a fixed position.

Mounted upon each side rail above or in proximity of each guide is a bearing block 43 rotatably supporting a horizontal frame axle 44. Suitably keyed or otherwise secured firmly to one end of the axle is a vertically disposed, rotatable, circular cutting implement or saw 45 positioned outwardly or laterally from a related rail. The saw is so arranged as to extend through the horizontal plane of the carriage base in order to render it effective during a sawing operation and, accordingly, to eliminate any interference between the saw and carriage, a saw accommodating path, slot or opening 46 is formed in the transfer table.

The housing of the power tractor intermediate the ends thereof is provided with an auxiliary housing 47 which encases a power take-off (not shown) operatively connected to the differential from which it derives its motive power. Outstanding laterally from the auxiliary housing and driven by the power take-off is a main or driving pulley 48 arranged to rotate in response to forces transmitted through the power take-off. At a location in back or arear of and above the main pulley is an auxiliary or driven pulley 49 secured by any desired means to the frame axle intermediate the vertically extended plane of the guides so as to form a part of the frame axle 44 and impart a rotative force thereto. Since the main and auxiliary pulleys are in alignment an endless belt 50 joins or connects these pulleys and, by reason of this arrangement, the main pulley drives the auxiliary pulley and thereby rotates the saw about the axis of the frame axle.

As previously stated, the strap 32 is made preferably adjustable so that the effective length thereof for a distance between its ends may be varied. This feature is incorporated in the rigging in order that the frame may be tilted about its lower rail toward or away from the tractor to vary the effective distance between the pulleys and ensure sufficient frictional forces between the belt and pulleys to render the rigging effective for the purpose for which it was designed. Accordingly, the strap preferably comprises a bar 51 and a bar 52 arranged in overlapping relation. The strap bars are coextensive for an appreciable extent and are provided with longitudinally spaced aligned apertures which accommodate connecting or tie means or bolts 53. The apertures may be made in the form of slots (not shown) but it is deemed sufficient to make them large enough only to accommodate the bolts and in changing the effective length of the strap from that illustrated it is necessary merely to remove one of the bolts 53 and jack knife the bars so that instead of being parallel and extending in the same direction they will be disposed at an angle to one another to cross adjacent the area of the unremoved bolt.

From the foregoing description considered together with the accompanying drawings it will be noted that various changes and alterations may be made to the illustrated and described construction without departing from within the spirit of the invention and scope of the appended claims.

I claim:

1. In combination with a tractor of the type having a rear housing and hydraulic responsive rotative arms above said housing, a pair of links having one end thereof connected to said housing, connecting means extending between said arms and intermediate the ends of said links, means extending between said arms and housing to prevent rotation of said arms in one direction, a draw bar joining the free extremities of said links, means having one end secured to said tractor above said link-housing connection, a vertically disposed frame removably supported by said draw bar, pivot means connecting said first named means and frame, a driven shaft secured to said frame and having a saw associated with one extremity thereof, spaced horizontal guides outstanding from said frame, and carriage means associated with said guides and arranged for movement toward and away from said shaft.

2. In combination with a tractor of the type having a rear housing and hydraulic responsive rotative arms above said rear housing, a pair of links having one end thereof connected to and below said housing, tie means extending between said arms and intermediate the ends of said links, supporting means connected to said arms and bearing upon said rear housing to maintain said arms in a predetermined position, a horizontal draw bar joining the free extremities of said links, adjustable means having one end secured to said tractor above said link-housing connection, a vertical frame having a lower extremity removably secured to said draw bar, means connecting said adjustable means and an upper extremity of said frame, a driven shaft attached to said frame intermediate the height thereof, a saw associated with one extremity of said shaft, spaced guides outstanding from said frame, and carriage means movably associated with said guides.

JOHN LEONARD WESTMORELAND.

REFERENCES CITED

The following references are of record in the file of this patent:

UNITED STATES PATENTS

| Number | Name | Date |
| --- | --- | --- |
| 1,691,581 | Mueller et al. | Nov. 13, 1928 |
| 1,798,402 | Dibble | Mar. 31, 1931 |
| 2,181,047 | Collett | Nov. 21, 1939 |
| 2,350,880 | Dellinger et al. | June 6, 1944 |

FOREIGN PATENTS

| Number | Country | Date |
| --- | --- | --- |
| 101,436 | Australia | June 24, 1937 |

OTHER REFERENCES

Page 1060 of the catalog No. 179, Fall and Winter, 1939-1940 of Sears, Roebuck & Co., Philadelphia, Pa.